(12) United States Patent
Li et al.

(10) Patent No.: US 10,890,831 B2
(45) Date of Patent: Jan. 12, 2021

(54) GIMBAL STRUCTURE

(71) Applicant: SZ DJI OSMO TECHNOLOGY CO., LTD., Shenzhen (CN)

(72) Inventors: Weidong Li, Shenzhen (CN); Yashuai Li, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/601,172

(22) Filed: Oct. 14, 2019

(65) Prior Publication Data

US 2020/0041879 A1    Feb. 6, 2020

Related U.S. Application Data

(63) Continuation of application No. PCT/CN2017/089162, filed on Jun. 20, 2017.

(30) Foreign Application Priority Data

Apr. 20, 2017  (CN) .................... 2017 2 0422815 U

(51) Int. Cl.
*G03B 17/56* (2006.01)
*F16M 11/08* (2006.01)
(Continued)

(52) U.S. Cl.
CPC ........... *G03B 17/561* (2013.01); *F16M 11/08* (2013.01); *F16M 11/12* (2013.01); *F16M 11/18* (2013.01); *F16M 2200/024* (2013.01)

(58) Field of Classification Search
USPC ................................ 396/428, 419, 421, 427
See application file for complete search history.

(56) References Cited

U.S. PATENT DOCUMENTS 6,170,965 B1 *   1/2001   Kotovsky .................. F21S 8/02
                                                            362/147
2004/0113033 A1 *  6/2004  Johnson ................. F16M 11/18
                                                            248/183.3
(Continued)

FOREIGN PATENT DOCUMENTS

CN       101311607 A     11/2008
CN       202612989 U     12/2012
(Continued)

OTHER PUBLICATIONS

The World Intellectual Property Organization (WIPO) International Search Report for PCT/CN2017/089162 dated Jan. 19, 2018 6 pages.

*Primary Examiner* — Rodney E Fuller
(74) *Attorney, Agent, or Firm* — Anova Law Group, PLLC

(57) ABSTRACT

A gimbal structure includes an electric motor including an electric motor output shaft and an electric motor housing, a gimbal shaft assembly coupled with the electric motor output shaft, and a slidable lock mechanism arranged at one of the electric motor housing and the gimbal shaft assembly. The slidable lock mechanism is configured to switch between an engaged state and a disengaged state. In the engaged state, the slidable lock mechanism engages with another one of the electric motor housing and the gimbal shaft assembly to limit rotation of the gimbal shaft assembly relative to the electric motor. In the disengaged state, the slidable lock mechanism disengages from the other one of the electric motor housing and the gimbal shaft assembly to release restriction between the gimbal shaft assembly and the electric motor.

11 Claims, 3 Drawing Sheets

(51) Int. Cl.
*F16M 11/12* (2006.01)
*F16M 11/18* (2006.01)

(56) References Cited

U.S. PATENT DOCUMENTS

| | | | |
|---|---|---|---|
| 2005/0052531 A1* | 3/2005 | Kozlov | H04N 5/23287 348/143 |
| 2011/0243733 A1 | 10/2011 | Chien | |
| 2011/0273612 A1* | 11/2011 | Chapman | H04N 5/232 348/373 |
| 2016/0201847 A1* | 7/2016 | Firchau | F16M 11/24 224/567 |

FOREIGN PATENT DOCUMENTS

| | | |
|---|---|---|
| CN | 203656513 U | 6/2014 |
| CN | 104832772 A | 8/2015 |
| CN | 104885342 A | 9/2015 |
| CN | 104965527 A | 10/2015 |
| CN | 105090699 A | 11/2015 |
| CN | 105517903 A | 4/2016 |
| CN | 206973194 U | 2/2018 |
| DE | 4217128 C2 | 4/1994 |

* cited by examiner

GIMBAL STRUCTURE

CROSS REFERENCE TO RELATED APPLICATIONS

This application is a continuation of International Application No. PCT/CN2017/089162, filed on Jun. 20, 2017, which claims priority to Chinese Patent Application No. 201720422815.8, filed on Apr. 20, 2017, the entire contents of both of which are incorporated herein by reference.

TECHNICAL FIELD

The present disclosure relates to the field of gimbal technology and, more particularly, to an axis switchable gimbal structure.

BACKGROUND

All existing gimbals on the market are unable to switch among three-axis, two-axis, and single-axis types while all three types of the gimbals have their own advantages. In practical applications of the gimbals, sometimes it is possible to switch between a three-axis gimbal and a two-axis gimbal. For example, it is extremely difficult to purely rely on electric motors to keep following a fast-moving object. If a photographer can directly control the rotation of a camera through a two-axis gimbal, the effect will be more desirable. On the other hand, when shooting a still or slow-moving scene, a camera needs to use a three-axis gimbal to ensure that the captured images have sufficient stability. In this case, the traditional gimbal is unable to satisfy the application needs.

SUMMARY

In accordance with the disclosure, there is provided a gimbal structure including an electric motor including an electric motor output shaft and an electric motor housing, a gimbal shaft assembly coupled with the electric motor output shaft, and a slidable lock mechanism arranged at one of the electric motor housing and the gimbal shaft assembly. The slidable lock mechanism is configured to switch between an engaged state and a disengaged state. In the engaged state, the slidable lock mechanism engages with another one of the electric motor housing and the gimbal shaft assembly to limit rotation of the gimbal shaft assembly relative to the electric motor. In the disengaged state, the slidable lock mechanism disengages from the other one of the electric motor housing and the gimbal shaft assembly to release restriction between the gimbal shaft assembly and the electric motor.

BRIEF DESCRIPTION OF THE DRAWINGS

To more clearly illustrate the technical solution of the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Some embodiments of the present disclosure will be described in detail below with reference to the accompanying drawings. Under the circumstances of no conflict, the following embodiments and features in the embodiments can be combined with each other.

Figure 1:
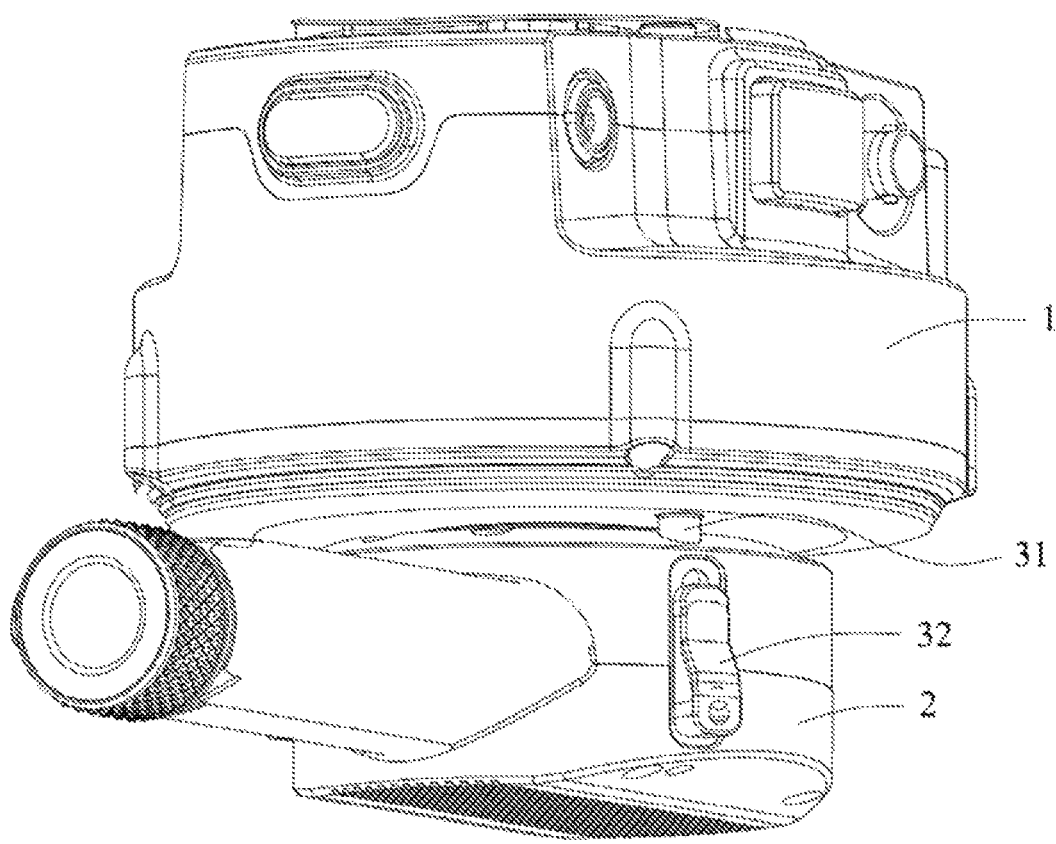
FIG. 1 is a partial perspective view of a gimbal structure according to an example embodiment of the present disclosure.
Figure 2:
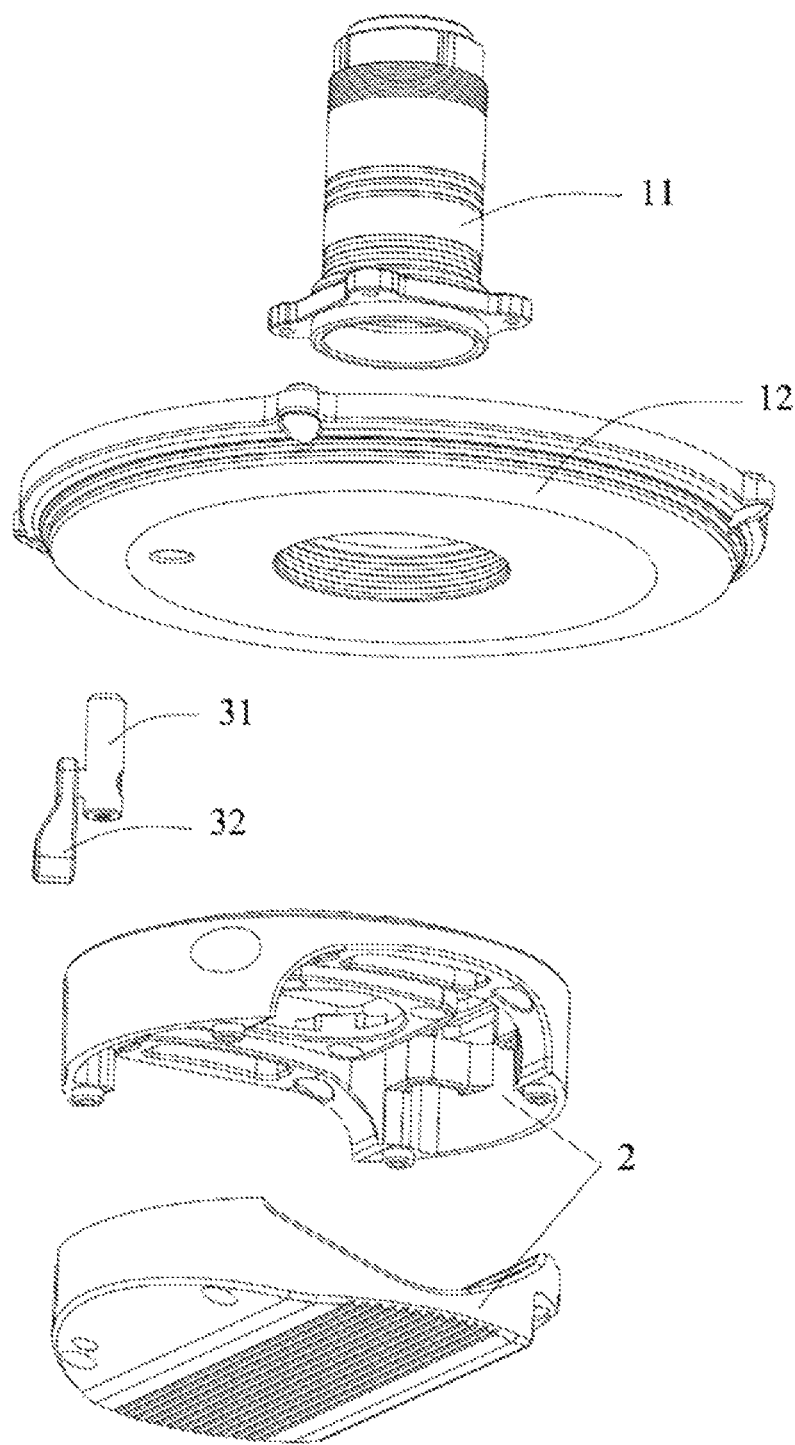
FIG. 2 is a partial exploded view of a gimbal structure according to an example embodiment of the present disclosure.
Figure 3:
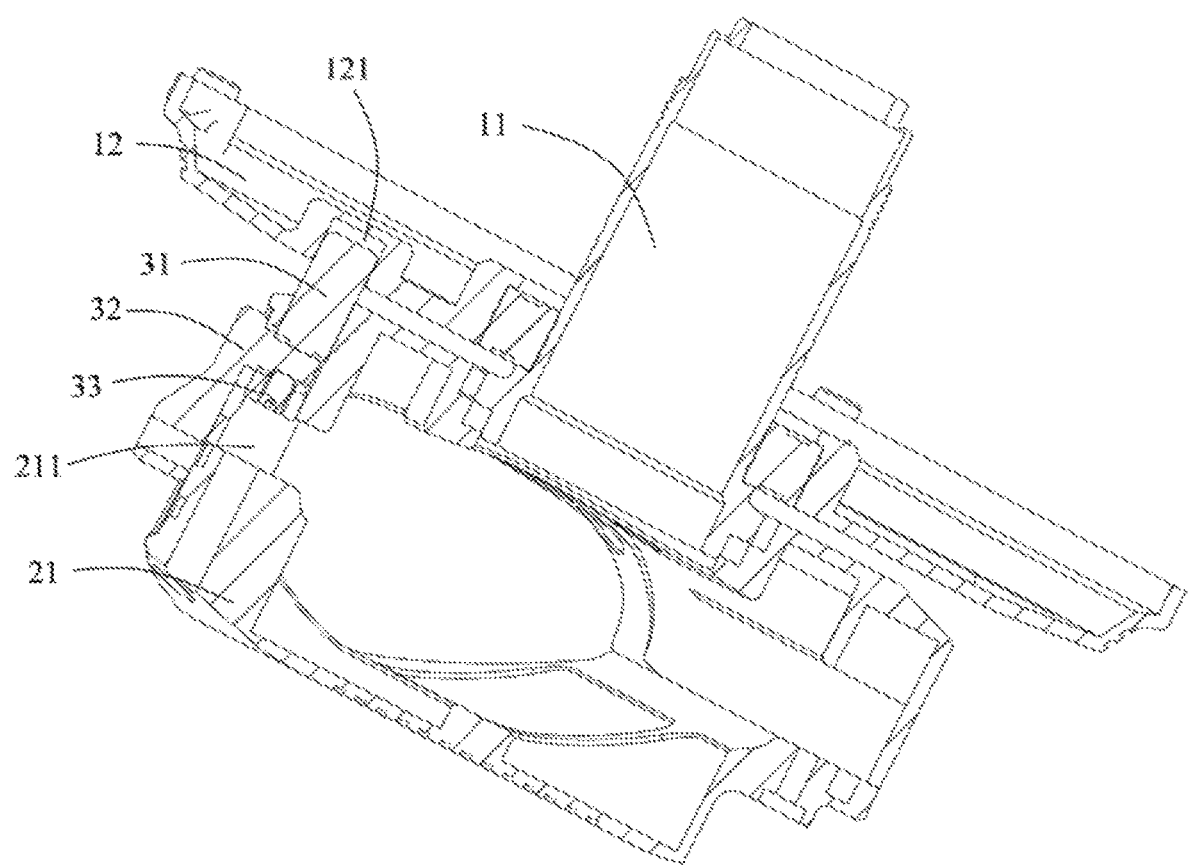
FIG. 3 is a partial cross-sectional view of a gimbal structure according to an example embodiment of the present disclosure.

As shown in FIGS. 1-3, the gimbal structure provided by the embodiments of the present disclosure includes: an electric motor 1 and a gimbal shaft assembly 2. The electric motor 1 includes an electric motor output shaft 11 and an electric motor housing 12. The electric motor housing 12 is fixed to the gimbal structure. The electric motor output shaft 11 is driven to rotate relative to the electric motor housing 12. The gimbal shaft assembly 2 is connected to the electric motor output shaft 11. Driven by the electric motor output shaft 11, the gimbal shaft assembly 2 rotates with the electric motor output shaft 11 to adjust an angle of the gimbal shaft assembly 2, thereby adjusting an angle of a load mounted on the gimbal structure. In one embodiment, the gimbal structure includes a three-axis gimbal. The load includes a photographing device (such as a camera). The three-axis gimbal is driven by the electric motor 1 to achieve shooting at any angle by the photographing device mounted on the gimbal structure. It is convenient for a user to shoot and a desired shooting effect can be achieved by the photographing device.

The gimbal structure also includes a slidable lock mechanism disposed between the electric motor housing 12 and the gimbal shaft assembly 2. The slidable lock mechanism may move along a direction the electric motor housing 12 and the gimbal shaft assembly 2 face toward each other (e.g., an axial direction of the motor housing 12) to engage with the electric motor housing 12 to limit rotation of the gimbal shaft assembly 2 relative to the electric motor 1. Alternatively, the slidable lock mechanism disengages from the electric motor housing 12 to release restriction between the gimbal shaft assembly 2 and the electric motor 1.

In one embodiment, when the electric motor 1 is in a power-off state, the slidable lock mechanism engages with the electric motor housing 12 to limit the rotation of the gimbal shaft assembly 2 relative to the electric motor 1, such that the gimbal structure no longer has a stabilization function in a direction in which the electric motor 1 drives, thereby switching the three-axis gimbal to a two-axis gimbal or a single-axis gimbal. Using the slidable lock mechanism to limit the rotation of the gimbal shaft assembly 2 relative to the electric motor 1 may also prevent collision damages caused by uncontrolled rotation between the electric motor 1 and the gimbal shaft assembly 2 from occurring during the transportation of the gimbal structure. When the slidable lock mechanism releases the restriction of the rotation between the gimbal shaft assembly 2 and the electric motor 1 and the electric motor 1 is in the power-off state, the electric motor 1 and the gimbal shaft assembly 2 may randomly rotate with each other. In this case, powering up the electric motor 1 drives the gimbal shaft assembly 2 to rotate relative to the electric motor housing 12, such that the gimbal structure resumes its stabilization function in the direction in which the electric motor 1 drives. As such, the photographing device mounted on the gimbal shaft assembly 2 may follow a photographed object to perform the shooting, and the single-axis gimbal is switched to the two-axis gimbal or the two-axis gimbal is switched to the three-axis gimbal.

Further, in one embodiment, the slidable lock mechanism includes a locking member 31. Driven by an external force, the locking member 31 moves along the direction the electric motor housing 12 and the gimbal shaft assembly 2 face toward each other to engage with or disengage from the electric motor housing 12. In one embodiment, under a normal circumstance, driven by the electric motor output shaft 11, the gimbal shaft assembly 2 may rotate relative to the electric motor housing 12. In one embodiment, with a force applied on the locking member 31, the locking member 31 moves toward the electric motor housing 12 to latch onto the electric motor housing 12, such that the gimbal shaft assembly 2 and electric motor housing 12 are stationary relative to each other. That is, the rotation of the gimbal shaft assembly 2 is restricted. In another embodiment, with a different force applied on the locking member 31, the locking member 31 moves away from the electric motor housing 12 to disengage from the electric motor housing 12. That is, the restriction of the rotation between the gimbal shaft assembly 2 and the electric motor housing 12 is removed and the gimbal shaft assembly 2 may rotate relative to the electric motor housing 12.

In some embodiments, the gimbal shaft assembly 2 includes a shaft housing 21. The locking member 31 is provided at the shaft housing 21. Further, the shaft housing 21 includes an accommodation cavity 211 to accommodate the locking member 31. Driven by an external force, the locking member 31 moves inside the accommodation cavity 211. Correspondingly, the electric motor housing 12 includes a positioning hole 121 to couple with a first end of the locking member 31. When a second end of the locking member 31 relative to the first end moves into the accommodation cavity 211, the first end of the locking member 31 disengages from the positioning hole 121. In one embodiment, the first end of the locking member 31 is an end of the locking member 31 adjacent to the electric motor housing 12, and the second end is another end of the locking member 31 far away from the electric motor housing 12. In some embodiments, the positioning hole 131 has a shape and structure matching the shape and structure of the end of the locking member adjacent to the electric motor housing 12. As such, after the locking member 31 is inserted into the positioning hole 121, the locking member 31 is unable to move in a radial direction of the positioning hole 121. In some embodiments, the positioning hole 121 may also be a positioning groove.

In some embodiments, the locking member 31 is configured on the electric motor housing 12. The electric motor housing 12 includes the accommodation cavity 211 to accommodate the locking member 31. Driven by an external force, the locking member 31 moves inside the accommodation cavity 211. Correspondingly, the positioning hole 121 or the positioning groove coupling with one end of the locking member 31 is configured on the housing of the gimbal shaft assembly 2.

Further, the slidable lock mechanism also includes a driving member 32 connected to the locking member 31. The driving member 32 drives the locking member 31 to move along the direction the electric motor housing 12 and the gimbal shaft assembly 2 face toward each other. The driving member 32 facilitates the user to operate the locking member 31.

In some embodiments, the slidable lock mechanism may also latch onto the electric motor housing 12 through a hook to fix the gimbal shaft assembly 2 relative to the electric motor housing 12. In addition, the slidable lock mechanism may latch onto the electric motor housing 12 by adjusting a retaining structure or a holding structure. Other structures for fixing the gimbal shaft assembly 2 relative to the electric motor housing 12 are all within the scope of the present disclosure.

In some embodiments, the locking member 31 is a pin and the driving member 32 is a push button. After the push button is connected to the pin, the push button is disposed outside the shaft housing 21. Further, slidable lock mechanism also includes a fixing member 33 that fixes the driving member 32 and the locking member 31 together. In one embodiment, the fixing member 33 may be threads configured on the driving member 32. Correspondingly, the locking member 31 includes a thread hole that matches the threads. In another embodiment, the fixing member 33 may be threads configured on the locking member 31. Correspondingly, the driving member 32 includes the thread hole that matches the threads. The fixing member 33 is not limited to the thread structure described above. Any fixing structure that fixes the locking member 31 and the driving member 32 together should fall within the scope of the present disclosure. In some embodiments, the driving member 32 may also be formed integrally with the locking member 31.

In one embodiment, the locking member 31 is a pin and the driving member 32 is a spring. The driving member 32 provides an elastic force to the pin, such that the locking member 31 can be elastically pushed out of the accommodation cavity 211 of the shaft housing 21, thereby being mounted on the electric motor housing 12. The spring may also be compressed, such that the locking member 31 retracts into the accommodation cavity 211 to release the rotation restriction between the gimbal shaft assembly 2 and the electric motor 1.

In the present disclosure, the slidable lock mechanism is configured between the electric motor of the gimbal and the gimbal shaft assembly. The slidable lock mechanism restricts the rotation of the gimbal shaft assembly relative to the electric motor to quickly lock or release the electric motor and the gimbal shaft assembly, thereby satisfying the market demand for multi-purpose gimbal structure. On the other hand, during the transportation of the gimbal, the electric motor in the gimbal structure is in the power-off state. In this case, the electric motor and the connected gimbal shaft assembly may randomly rotate relative to each other without any control. If not fixed, the gimbal structure may be damaged due to collisions and bumps during the transportation. Thus, the slidable lock mechanism is used to restrict the rotation of the gimbal shaft assembly relative to the electric motor, thereby avoiding the damages to the gimbal structure during the transportation.

With the consideration of the specification and practicing the disclosed embodiments, other embodiments of the present disclosure will be apparent to those skilled in the art. The present disclosure is intended to cover any variations, uses, or adaptations of the present disclosure, which are in accordance with the general principles of the present disclosure and include common knowledge or conventional technical means in the art that are not disclosed in the present disclosure. The specification and the embodiments are to be regarded as illustrative only, and the true scope and spirit of the present disclosure are indicated by the following claims.

The foregoing descriptions are merely some implementation manners of the present disclosure, but the scope of the present disclosure is not limited thereto. Any change or replacement that can be conceived by a person skilled in the art based on the technical scope disclosed by the present application should be covered by the scope of the present disclosure.

What is claimed is:

1. A gimbal structure comprising:
   an electric motor including an electric motor output shaft and an electric motor housing;
   a gimbal shaft assembly coupled with the electric motor output shaft; and
   a slidable lock mechanism arranged at one of the electric motor housing and the gimbal shaft assembly and configured to switch between an engaged state and a disengaged state;
   wherein:
      in the engaged state, the slidable lock mechanism engages with another one of the electric motor housing and the gimbal shaft assembly along an axial direction of the electric motor output shaft to limit rotation of the gimbal shaft assembly with rotation of the electric motor output shaft relative to the electric motor housing; and
      in the disengaged state, the slidable lock mechanism disengages from the other one of the electric motor housing and the gimbal shaft assembly to release restriction between the gimbal shaft assembly and the electric motor to enable the gimbal shaft assembly to rotate with the electric motor output shaft relative to the electric motor housing to adjust an angle of the gimbal shaft assembly.

2. The gimbal structure of claim 1, wherein the slidable lock mechanism includes a locking member configured to move along the axial direction the electric motor housing and the gimbal shaft assembly face toward each other to engage with or disengage from the other one of the electric motor housing and the gimbal shaft assembly.

3. The gimbal structure of claim 2, wherein the slidable lock mechanism further includes a driving member configured to drive the locking member to move along the axial direction.

4. The gimbal structure of claim 3, wherein the slidable lock mechanism further includes a fixing member that fixes the driving member with the locking member.

5. The gimbal structure of claim 3, wherein the locking member includes a pin and the driving member includes a push button.

6. The gimbal structure of claim 5, wherein the push button is disposed outside the shaft housing.

7. The gimbal structure of claim 3, wherein the locking member includes a pin and the driving member includes a spring configured to provide an elastic force to the pin.

8. The gimbal structure of claim 2, wherein:
   the gimbal shaft assembly includes a shaft housing; and
   the locking member is provided at the shaft housing.

9. The gimbal structure of claim 8, wherein the electric motor housing includes a positioning hole or a positioning groove configured to couple with one end of the locking member.

10. The gimbal structure of claim 9, wherein:
    the shaft housing includes an accommodation cavity accommodating the locking member; and
    the end of the locking member is configured to disengage from the positioning hole or the positioning groove when another end of the locking member moves into the accommodation cavity.

11. The gimbal structure of claim 1, wherein the slidable lock mechanism is located at a shaft housing of the shaft assembly, and configured to engage with the electric motor housing in the engaged state and disengage from the electric motor housing in the disengaged state.

\* \* \* \* \*